United States Patent
Scollo et al.

(10) Patent No.: US 7,423,890 B2
(45) Date of Patent: Sep. 9, 2008

(54) PUSH-PULL CONVERTER, IN PARTICULAR FOR DRIVING COLD-CATHODE FLUORESCENT LAMPS

(75) Inventors: Rosario Scollo, Misterbianco (IT); Giuseppe Consentino, Piazza Armerina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 309 days.

(21) Appl. No.: 10/897,380

(22) Filed: Jul. 22, 2004

(65) Prior Publication Data

US 2005/0088859 A1 Apr. 28, 2005

(30) Foreign Application Priority Data

Jul. 25, 2003 (IT) .......................... TO2003A0578

(51) Int. Cl.
*H02M 3/335* (2006.01)
(52) U.S. Cl. ......................................... 363/22; 363/133
(58) Field of Classification Search ................... 363/22, 363/23, 24, 25, 133, 134
See application file for complete search history.

(56) References Cited

U.S. PATENT DOCUMENTS

| | | | | |
|---|---|---|---|---|
| 3,242,414 A | * | 3/1966 | Zelina | 363/22 |
| 3,249,894 A | * | 5/1966 | Massey | 331/113 A |
| 3,350,620 A | * | 10/1967 | Barron | 363/24 |
| 3,365,657 A | * | 1/1968 | Webb | 323/206 |
| 3,453,520 A | * | 7/1969 | Mas | 363/22 |
| 3,573,595 A | * | 4/1971 | Galluppi | 363/23 |
| 3,590,362 A | * | 6/1971 | Kakalec | 363/22 |
| 4,542,450 A | * | 9/1985 | Patel | 363/23 |
| 5,966,297 A | * | 10/1999 | Minegishi | 363/24 |
| 6,584,000 B1 | * | 6/2003 | Lee | 363/133 |

* cited by examiner

*Primary Examiner*—Adolf Berhane
(74) *Attorney, Agent, or Firm*—Lisa K. Jorgenson; Robert Iannucci; Seed IP Law Group PLLC

(57) ABSTRACT

A push-pull converter has a transformer provided with a primary winding and a secondary winding. A capacitive element is connected between the input terminals of the primary winding, and two switch elements are arranged between a respective input terminal of the primary winding through an inductor and a supply input of the converter. The current-input terminals of the switch elements are connected to one another, and the current-output terminals of the switch elements are each connected to the respective input terminals of the primary winding. The switch elements are made up of NPN bipolar transistors connected in common-collector configuration. The push-pull converter is particularly suited for driving a cold-cathode fluorescent lamp.

27 Claims, 4 Drawing Sheets

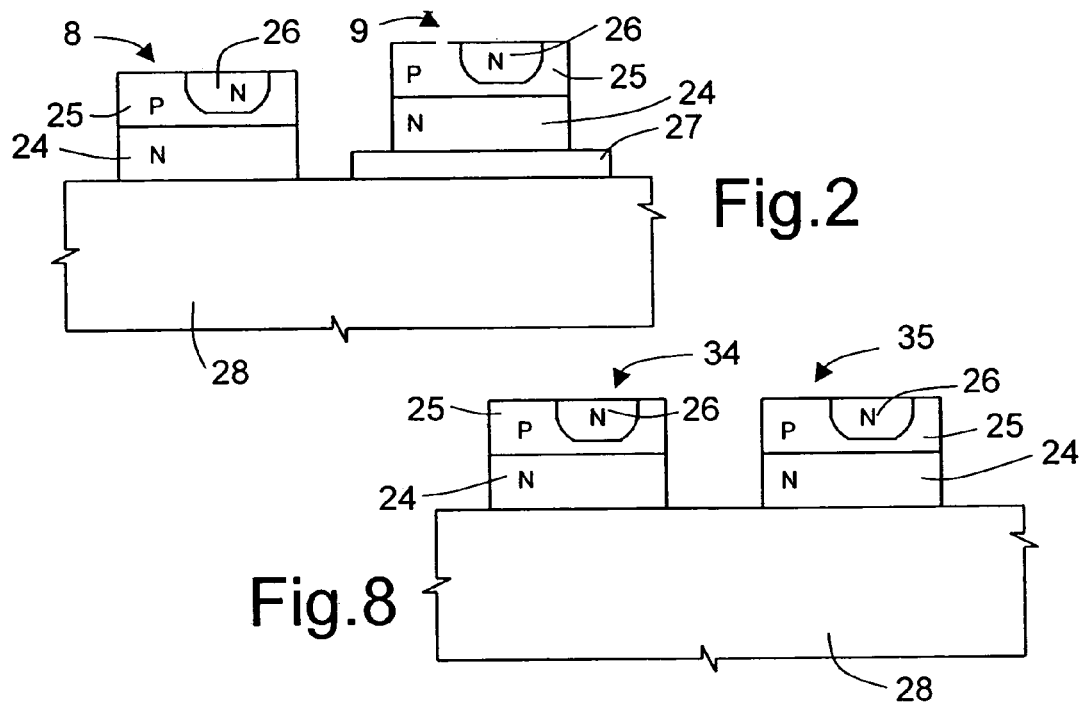
Fig.2
Fig.8
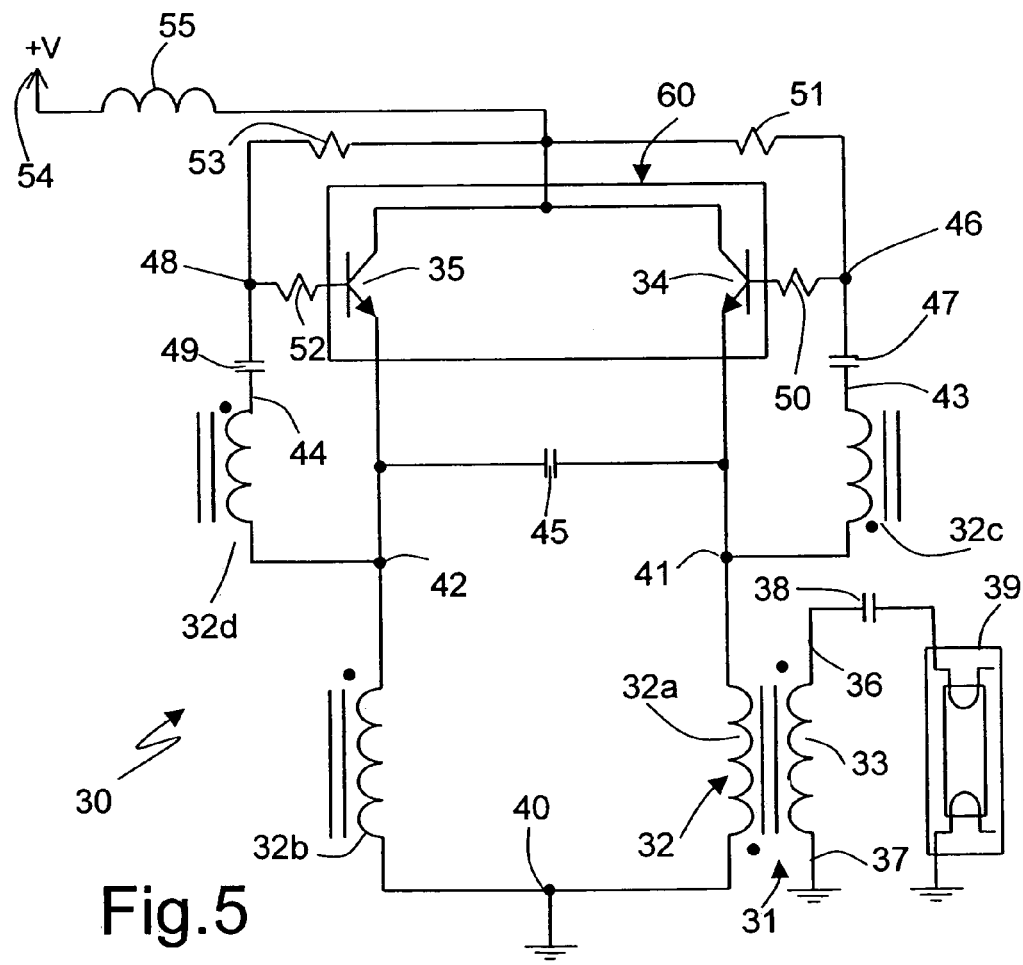
Fig.5

PUSH-PULL CONVERTER, IN PARTICULAR FOR DRIVING COLD-CATHODE FLUORESCENT LAMPS

BACKGROUND OF THE INVENTION

1. Field of the Invention

The present invention relates to a push-pull converter, in particular for driving cold-cathode fluorescent lamps (CCFLs).

2. Description of the Related Art

As is known, push-pull converters, whether of the current-source type or of the voltage-source type, are widely used in industrial power electronics applications and, in particular, in the lighting field, for driving emergency lamps or cold-cathode fluorescent lamps (CCFLs), the latter being commonly used for back-lighting of the screens of portable computers and for illuminating advertising signs.

The ensuing description will refer, without any loss of generality, to the use of a push-pull converter of current-source type for driving a cold-cathode fluorescent lamp.

In the specific case considered, the most common circuit configuration for push-pull converters uses a transformer provided with three windings, whereof the primary winding has a central tap and a pair of bipolar power transistors of NPN type in common-emitter configuration driven by a resonant system formed by a capacitor and by the primary winding of the transformer itself.

Usually, these converters are supplied with low d.c. voltages and generate high a.c. voltages, used for igniting the fluorescent tubes of cold-cathode fluorescent lamps.

FIG. 1 illustrates a possible circuit embodiment of a converter with current source.

In detail, a push-pull converter 1 comprises a transformer 2 with three windings, namely a primary winding 3, a secondary winding 4, and a tertiary winding 5.

The primary winding 3 has a first input terminal 6 and a second input terminal 7 connected to the drain terminals of a first transistor 8 and of a second transistor 9, respectively, both being of NPN bipolar type and having emitter terminals connected together and to ground. The primary winding 3 moreover has a central tap 10 connected, via an inductor 11, to a supply input 12 (for example, one that supplies a 12-Vdc voltage).

The central tap 10 divides the primary winding into two separate half-windings, namely a first half-winding 3a, connected to the first input terminal 6, and a second half-winding 3b, connected to the second input terminal 7.

The secondary winding 4 has a first output terminal 13, connected, with interposition of a capacitor 14, to a cold-cathode fluorescent lamp 15, and a second output terminal 16 connected to ground.

The tertiary winding 5 has a third output terminal 17 and a fourth output terminal 18, connected to the base terminals of the transistors 8 and 9, respectively.

The push-pull converter 1 further comprises a capacitor 19 connected between the input terminals 6 and 7 of the primary winding 3 and, hence, between the collector terminals of the transistors 8, 9. The base terminals of the transistors 8, 9 are moreover connected to the central tap 10 of the primary winding 3 via respective resistors 20 and 21.

Operation of the push-pull converter 1 is described hereinafter.

Upon turning on the circuit, the d.c. voltage supplied on the supply input 12 generates, in the inductor 11, a current of increasing value, which is supplied, via the resistors 20 and 21, to the bases of the transistors 8 and 9, respectively. In this situation, turning-on of one of the two transistors 8, 9, for example, transistor 8, is obtained. Consequently, there is a current flow in the first half-winding 3a, as well as in the tertiary winding 5, which contributes to maintaining the transistor 9 turned off by drawing current from its base. In this way, the resonant circuit formed by the primary winding 3 and the capacitor 19 is triggered and generates an a.c. voltage between the input terminals of the primary winding 3.

At the end of the turning-on step, the tertiary winding 5 of the transformer 2, which is connected to the bases of the transistors 8 and 9, enables, each time, just one of the two transistors, keeping the other turned off and thus preventing simultaneous conduction of both of them (cross-conduction), which would not enable correct operation of the push-pull converter 1.

In the steady-state condition, the current that traverses the inductor 11 flows, for one half-period, in the transistor 8 and in the first half-winding 3a and, for the other half-period, in the transistor 9 and in the second half-winding 3b. In this way, a variable flow is generated in the core of the transformer 2, which, by concatenating with the turns of the secondary winding 4, induces an electromotive force having a sinusoidal pattern and an adequate amplitude across the cold-cathode fluorescent lamp 15 (for example a sinusoidal voltage with peak amplitude of 800 V is induced).

After the cold-cathode fluorescent lamp 15 has been triggered, the resonance frequency of the circuit is determined not only by the capacitor 19 and by the primary winding 3, but also by the capacitor 14.

The resistors 20 and 21 perform a dual function, in so far as they enable triggering of the circuit in the turning-on step, by enabling the transistor 8 or the transistor 9, and, in addition, supply a fair amount of the base current to the transistor 8 or 9 that is each time turned on during steady-state operation of the push-pull converter 1.

The push-pull converter 1 of the type described has the advantage of enabling driving of fluorescent tubes, which require high a.c. voltages for their ignition, starting from a low d.c. voltage and, moreover, has the advantage of being very robust both in case of open-circuit load and in case of short-circuit on the output, without the addition of any further circuit components.

The above embodiment of the push-pull converter 1 presents however also the disadvantages outlined hereinafter.

The transistors 8 and 9, in common-emitter configuration, must be made as discrete components, in two separate islands. In fact, as illustrated in FIG. 2, the transistors 8, 9 are power transistors of vertical type; in detail, each transistor 8, 9 is formed by a chip comprising an N-type substrate 24, forming the collector, a P-type epitaxial layer 25, forming the base, and an N-type region 26, forming the emitter of the transistors 8, 9. To assemble the transistors 8, 9 in a same package using a same frame 28, it is hence necessary to separate the two collectors, by arranging an insulation region 27 underneath at least one of the two substrates 24. This entails, however, a considerable increase in the production costs.

In addition, a further disadvantage is represented by the fact that, during turning-on and -off of the transistors 8 and 9 current spikes are present both on the base terminals and on the collector terminals and these can give rise to electromagnetic interference (EMI). Such current spikes are due to the storage time of the bipolar transistors, i.e., the time necessary for the extraction of the charges from the base during turning-off of one of the two transistors and simultaneous turning-on of the other; during this time, the charges flow along the tertiary winding of the transformer and thus involve both of the transistors.

Said phenomenon is highlighted in FIG. 3, which shows the plots of the base current $I_b$, of the collector current $I_c$, and of the collector-emitter voltage $V_{ce}$ for one of the transistors 8, 9. As may be noted, both the base current $I_b$ and the collector current $I_c$ have current spikes at turning-on and/or at -off of the respective transistor 8, 9.

Finally, the push-pull converter 1 of FIG. 1 envisages use of a transformer provided with three distinct windings, as illustrated in FIG. 4, wherein the windings 3, 4, 5 of the transformer 2 and the corresponding input and output terminals are designated by the same reference numbers as the ones used in FIG. 1, and wherein the transistors 8, 9 are represented as open or closed switches, according to whether they are off or on, respectively. It is evident that the illustrated structure renders the production process complex and expensive.

BRIEF SUMMARY OF THE INVENTION

An embodiment of the present invention provides a converter of push-pull type, in particular for driving cold-cathode fluorescent lamps, which is free from of the drawbacks described above.

One embodiment of the invention is directed to a converter of push-pull type that includes: a supply input; a transformer having a primary winding and a secondary winding, the primary winding having a first input terminal and a second input terminal; a capacitive element connected between the first and second input terminals; and a first switch element and a second switch element, each having a current-input terminal, a current-output terminal and a control terminal. The current-input terminals of said switch elements are connected to one another and to said supply input and the current-output terminals of the switch elements connected respectively to the input terminals of the primary winding.

BRIEF DESCRIPTION OF THE SEVERAL VIEWS OF THE DRAWING(S)

For a better understanding of the invention, there is now described an embodiment, purely by way of non-limiting example and with reference to the attached drawings, wherein:

FIG. 2 shows a possible implementation of a part of the push-pull converter of FIG. 1;

FIG. 5 shows a circuit diagram of a push-pull converter according to the present invention;

FIG. 8 shows a possible implementation of the push-pull converter of FIG. 5.

DETAILED DESCRIPTION OF THE INVENTION

Figure 1:
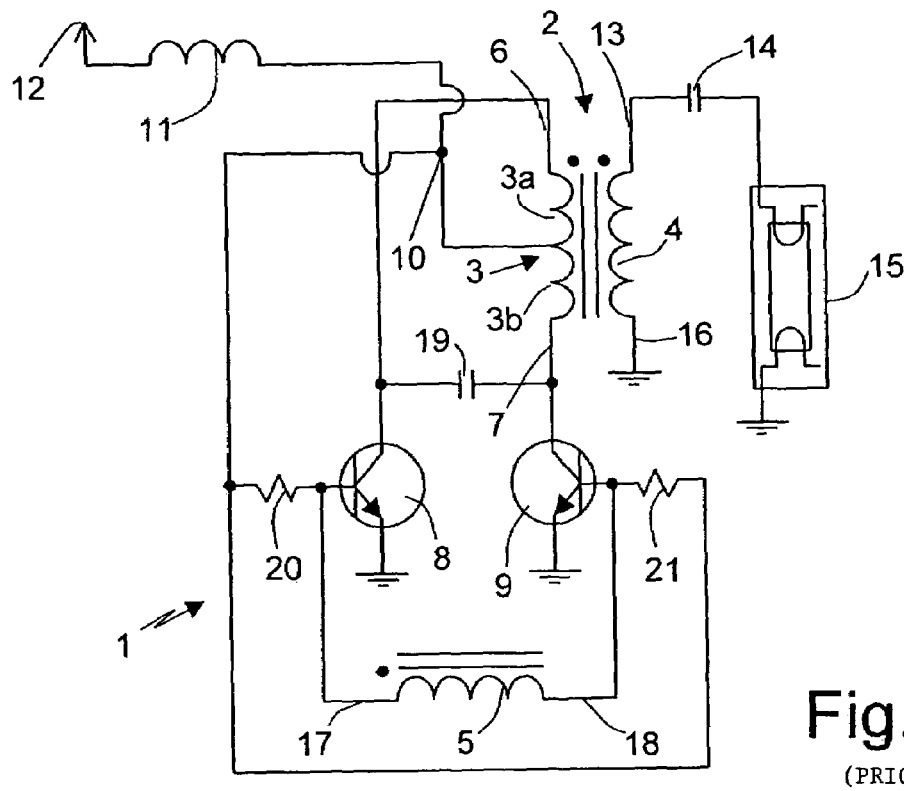
FIG. 1 illustrates a circuit diagram corresponding to a known push-pull converter.
Figure 4:
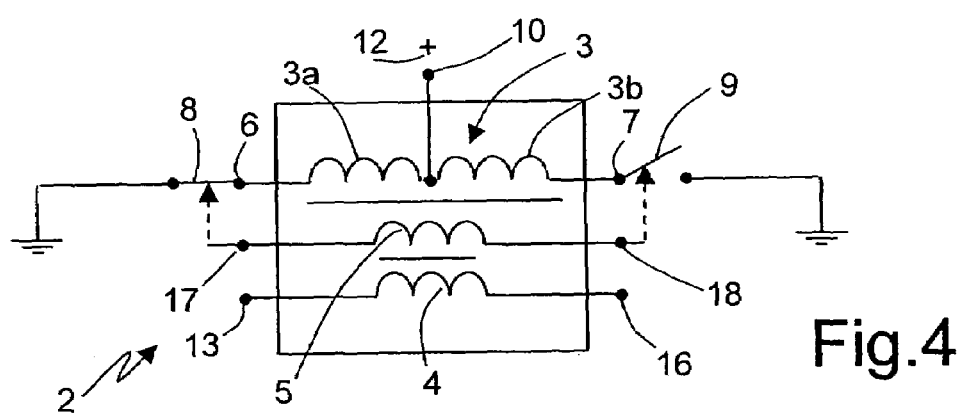
FIG. 4 shows a schematic diagram of the structure of a component of FIG. 1.

With reference to FIG. 5, a push-pull converter 30, of the current-source type, comprises a transformer 31 with two windings, a first transistor 34 and a second transistor 35. In detail, the transformer 31 comprises a primary winding 32 and a secondary winding 33, and the transistors 34, 35 are of NPN bipolar type in common-collector configuration.

Specifically, the secondary winding 33 of the transformer 31 has a first output terminal 36 connected, with the interposition of a capacitor 38, to a cold-cathode fluorescent lamp 39, and a second output terminal 37 grounded.

The primary winding 32 is divided into a first winding 32a and a second winding 32b by a central tap 40 connected to ground and has a first input terminal 41 connected to the first winding 32a, and a second input terminal 42 connected to the second winding 32b. The primary winding 32 further comprises a third winding 32c and a fourth winding 32d defining, respectively, a third input terminal 43 and a fourth input terminal 44. The third and fourth windings 32c and 32d, of small dimensions, have a few turns (for example, two to ten turns, preferably, two to five turns) and are the prolongation of the first winding 32a and of the second windings 32b, respectively.

The first and second input terminals 41 and 42 are connected to the emitter terminals of the transistors 34 and 35. A resonance capacitor 45 is connected between the input terminals 41 and 42 and, hence, between the emitter terminals of the transistors 34, 35. The third input terminal 43 is connected to a first node 46 via a first charge capacitor 47, and, in a similar way, the fourth input terminal 44 is connected to a second node 48 via a second charge capacitor 49. The first node 46 is connected to the base terminal of the first transistor 34 via a first base resistor 50 and to the collector terminals of the transistors 34 and 35 via a first triggering resistor 51. Likewise, the second node 48 is connected to the base terminal of the second transistor 35 via a second base resistor 52 and to the collector terminals of the transistors 34 and 35 via a second triggering resistor 53.

Finally, the collector terminals of the transistors 34 and 35 are connected to a supply input 54 which supplies a d.c. voltage (for example, 12 V), via an inductor 55.

Figure 6:
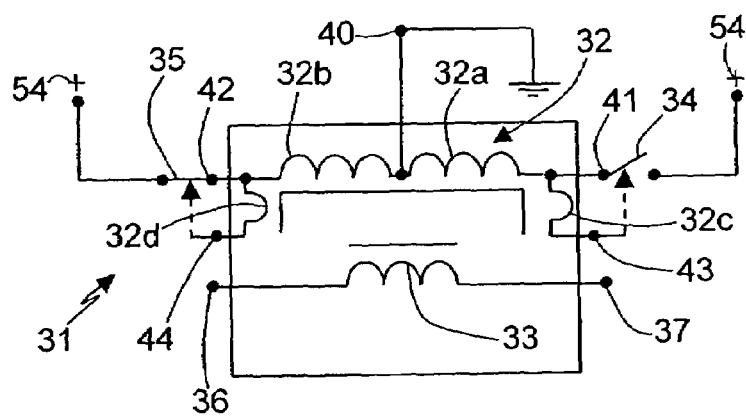
FIG. 6 shows a schematic diagram of the structure of a component of FIG. 5.

The internal structure of the transformer 32 is illustrated, for greater clarity, in FIG. 6, wherein the windings 32, 33 and the corresponding input and output terminals have been designated by the same reference numbers as the ones used in FIG. 5 and wherein the transistors 34, 35 are represented as open or closed switches.

Operation of the push-pull converter 30 is described hereinafter.

Similarly to the push-pull converter 1 of FIG. 1, upon turning-on, the d.c. voltage supplied by the supply input 54 generates, in the inductor 55, a current of increasing value, which is supplied, via the triggering resistors 51 and 53, to the base terminals of the transistors 34 and 35. During turning-on, the charge capacitors 47 and 49 are initially charged by the current generated by the inductor 55 and then, after being charged, prevent the passage of the current towards the lower half of the push-pull converter 30 so that the current generated by the inductor 55 flows substantially in the base terminals of the transistors 34 and 35, through the base resistances 50 and 52. In this way, start-up of the push-pull converter 30 is guaranteed.

Also here, one of the transistors 34 or 35 is turned on first, for example, the first transistor 34, and enables current flow through the respective winding (for example, the first winding 32a). In this step, since the fourth winding 32d has a polarity opposite to that of the third winding 32c, it contributes to keeping the second transistor 35 off by drawing current from its base. The passage of current in the primary winding 32 causes triggering of the resonant circuit formed by the primary winding 32 and by the resonance capacitor 45 and hence generation of an a.c. voltage across the transformer 31, the frequency whereof is mainly determined by the value of the capacitance of the resonance capacitor 45 and by the value of the intrinsic inductance of the primary winding 32.

In the steady-state condition, the transistors 34 and 35 are turned on alternately, in so far as since the third winding 32c and the fourth winding 32d have opposite polarity, they divert the current coming from the inductor 55 either into the first winding 32a or into the second winding 32b of the primary winding 32, thus preventing simultaneous conduction of the transistors 34, 35. In detail, during a first half-period, when the first transistor 34 is turned on, the current coming from the inductor 55 flows through this coil and through the first winding 32a of the transformer 31, while, during a second half-period, when the first transistor 34 is off and the second transistor 35 is on, the current flows in the latter and in the second winding 32b of the transformer 31.

A variable flow is consequently generated in the primary winding 32 and is concatenated with the turns of the secondary winding 33, enabling ignition and turning-on of the cold-cathode fluorescent lamp 39. The operation frequency of the push-pull converter 30 is determined also here chiefly by the primary winding 32 and by the capacitor 45, and, to a lesser extent, by the charge capacitors 47 and 49 and by the capacitor 38.

The two triggering resistors 51 and 53, in addition to contributing to triggering the push-pull converter 30 during turning-on, as described above, enable discharge of the charge capacitors 47 and 49, during turning-off of the respective transistors 34 and 35. The base resistors 50 and 52 regulate, instead, in an appropriate way, turning-on and turning-off of the transistors 34 and 35.

Figure 7:
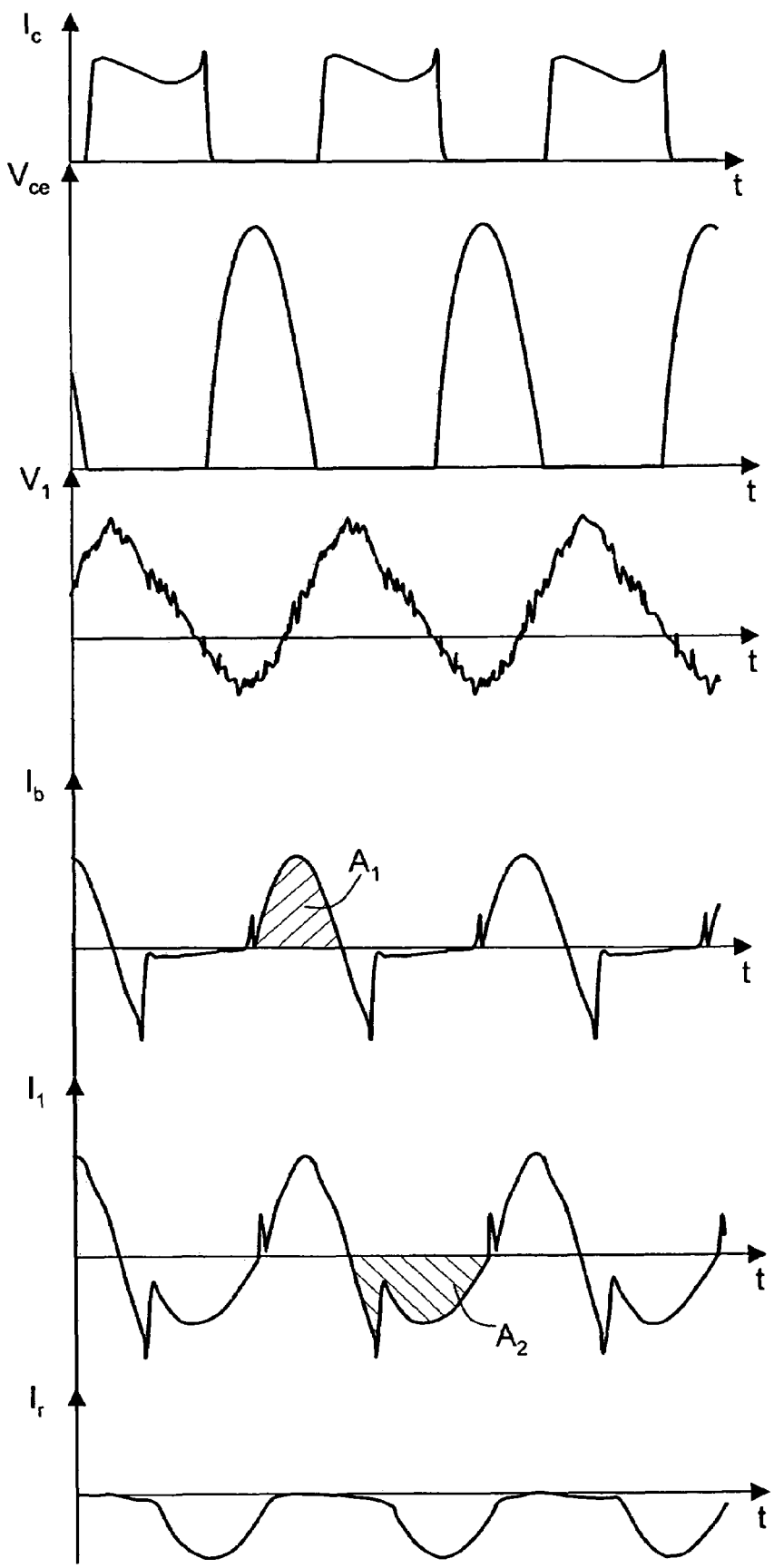
FIG. 7 shows the plots of some electrical quantities of the push-pull converter of FIG. 5.

FIG. 7 shows the plots of some electrical quantities of the push-pull converter 30; namely, the voltage and current of the first charge capacitor 47, designated respectively by $V_1$ and $I_1$, the base current of the first transistor 34, designated by $I_b$, the collector current of the first transistor 34, designated by $I_c$, and the current of the first triggering resistor 51, designated by $I_r$. Of course, given the specularity of the push-pull converter 30, the above plots apply also to the second charge capacitor 49, to the second transistor 35 and to the second triggering resistor 53.

In detail and with reference to FIG. 7, during a first operation half-period, when the transistor 34 is on, current flows towards the base terminal of the first transistor 34. Since in this step the voltage drop across the base terminal and collector terminal of the first transistor 34 is practically zero, the voltage across the triggering resistor 51 is also practically zero, and the latter does not conduct current. All the current entering the base terminal of the first transistor 34 is therefore supplied by the discharge of the first charge capacitor 47. This is clearly highlighted by the perfect coincidence, during the half-period of turning-on of the first transistor 34, of the curve corresponding to the base current $I_b$ and the curve corresponding to the current $I_1$ of the first charge capacitor 47. The area under the curves of $I_b$ and $I_1$, which is designated by $A_1$, hence represents the amount of charge supplied by the first charge capacitor 47 to the base terminal of the first transistor 34.

At the beginning of the second half-period, the third winding 32c reverses its own polarity and causes the first transistor 34 to turn off; in this step, the base current reverses its direction on account of the extraction of electrical charges from the base-emitter junction of the first transistor 34. The charges extracted from the base terminal of the first transistor 34 are supplied to the first charge capacitor 47 and contribute to the initial charging thereof.

Figure 3:
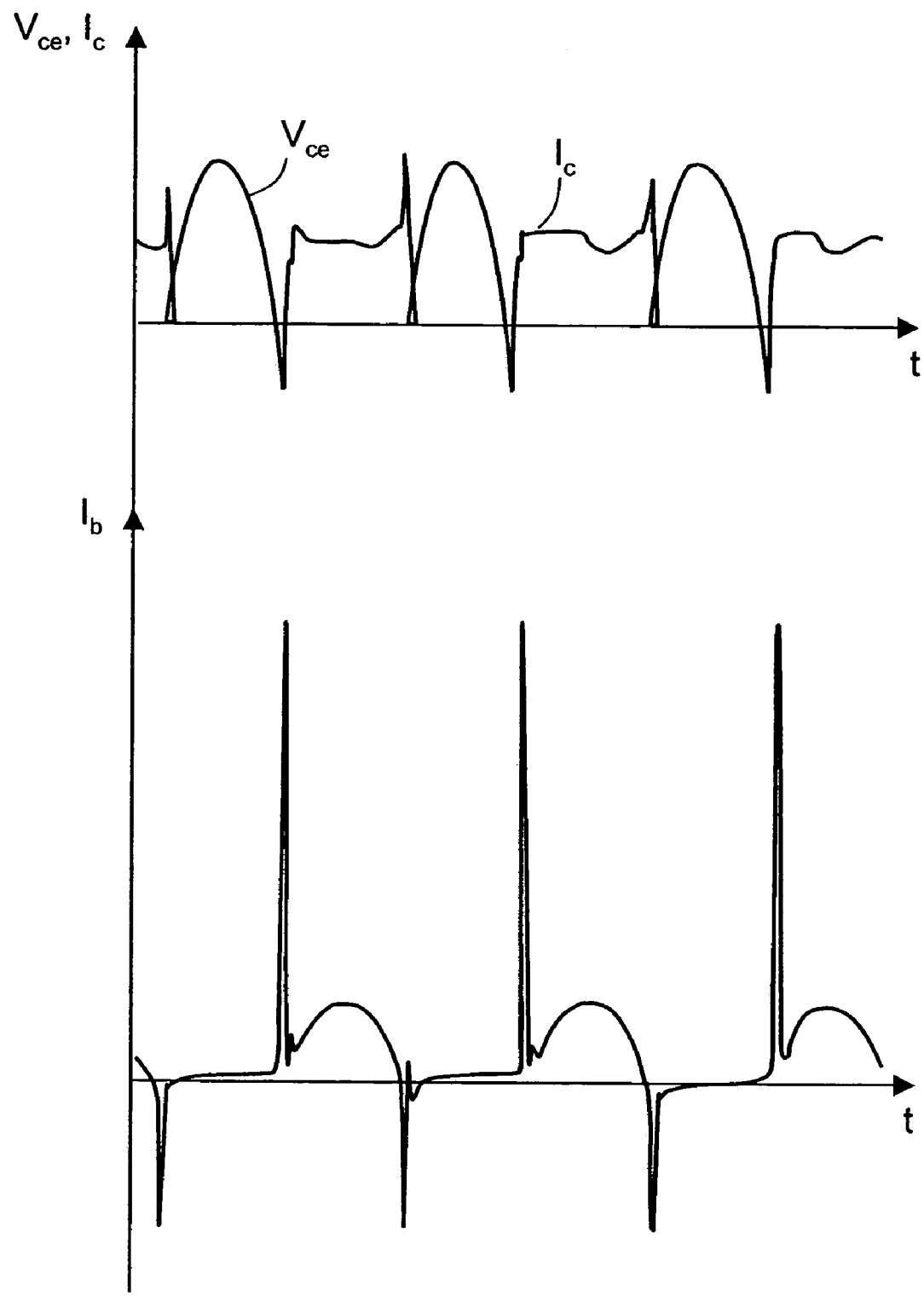
FIG. 3 shows the plots of some electrical quantities of the push-pull converter of FIG. 1.

As may be noted, the spikes of the base current $I_b$ appearing in FIG. 7 linked to the first transistor 34 switching are very small as compared to the corresponding spikes appearing in FIG. 3 for the known push-pull converter, given that the charges extracted during turning-off can flow towards the first charge capacitor 47.

After the first transistor 34 has turned off, the first charge capacitor 47 continues to be charged through the first triggering resistor 51, until the area $A_2$, corresponding to the charge stored again at the plates of the first charge capacitor 47, equals in absolute value to the area $A_1$; the charge yielded by the first charge capacitor 47 in the on state of the first transistor 34 must, in fact, necessarily equal the amount of charge accumulating on the plates of the first charge capacitor 47 in the off state of the first transistor 34, in so far as, otherwise, the voltage across the first charge capacitor 47 would, from period to period, constantly increase or constantly decrease, and the push-pull converter 30 would stop working.

While the first transistor 34 is off, the voltage drop across its base-collector junction, and hence across the first triggering resistor 51, reaches a peak approximately 40 V, and hence a non-zero current $I_r$ with negative sign flows through the first triggering resistor 51, as may be seen in FIG. 7.

The curve corresponding to the voltage $V_1$ across the first charge capacitor 47 presents a periodic pattern and assumes both positive and negative values, in so far as the first charge capacitor 47, throughout the entire period, is completely discharged and is recharged with charge of opposite sign. Furthermore, the curve is shifted upwards with respect to the zero voltage value, since a positive d.c. voltage is superimposed on the variable component generated by the discharging and charging of the first charge capacitor 47 during turning-on and -off of the first transistor 34.

FIG. 8 shows a possible implementation of the push-pull converter 30 of FIG. 5.

In particular, since the transistors 34, 35 have a common-collector configuration, it may be noted that they may be obtained from a same frame 28, without requiring any additional insulating layer; in fact the collectors formed by the substrates 24 are connected to one another, while the emitters, each of which is obtained from an own N-type region 26 within the respective base region formed by the epitaxial layers 25, are electrically separated. In this way, the transistors 34, 35 can be built in a single package 60, represented schematically in FIG. 5.

Furthermore, the transistors 34, 35 can be readily integrated in a single wafer, by envisaging an appropriate insulation between the base regions.

From the above, the advantages of the present invention can be clearly derived.

In particular, the use of transistors in common-collector configuration, instead of ones in common-emitter configuration, enables the transistors to be formed in a single package and using just one island and just one 5-pin frame, thus leading to a considerable reduction both of the production costs and of the space occupied by the push-pull converter. This saving is all the more important if it is considered that the transistors used in the applications that exploit a converter of the type proposed herein are medium-power to low-power ones, i.e., small-sized ones, and hence the cost of the package has a higher incidence than the cost of production of the transistor.

Furthermore, the described embodiment of the transformer, which does not require a tertiary winding, but uses two windings of small dimensions forming a mere prolongation of the primary winding, enables a reduction in the circuit complexity and in the production costs.

The push-pull converter described moreover enables a drastic reduction of the spikes in the base currents and collector currents, during switching of the transistors, as compared to the known solution, thus eliminating or in any case reducing considerably the consequent electromagnetic interference.

The push-pull converter described then presents an excellent electrical behaviour and a high stability of the electrical characteristics. The losses during switching of the transistors are moreover negligible, and hence the thermal performance of the circuit is considerably improved in terms of the temperature measured on the package of the circuit ($T_{case}$).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Finally, it is clear that modifications and variations may be made to the push-pull converter described herein, without thereby departing from the scope of the present invention, as defined in attached claims. For example, even though the invention has been described with reference to bipolar transistors as switching elements operating alternately in the two operation half-periods, the switches could be implemented using different components, such as MOS transistors or IGBTs. In this case, the common terminals are the drain terminals or, more in general, the current-input terminals.

The invention claimed is:

1. A converter of push-pull type, comprising:
   a positive supply input;
   a transformer having a primary winding and a secondary winding, said primary winding having a first input terminal and a second input terminal;
   a capacitive element connected between said first and second input terminals;
   a first NPN transistor and a second NPN transistor, each having a collector, an emitter, and a base,
   wherein said collectors of said transistors are directly connected to one another and coupled to said supply input; and said emitters of said transistors are each connected to a respective one of said input terminals of said primary winding; and
   a first inductive element and a second inductive element, said first inductive element being connected between said first input terminal and said control terminal of said first switch element, and said second inductive element being connected between said second input terminal and said control terminal of said second switch element.

2. A converter of push-pull type, comprising:
   a positive supply input;
   a transformer having a primary winding and a secondary winding, said primary winding having a first input terminal and a second input terminal;
   a capacitive element connected between said first and second input terminals;
   a first switch element and a second switch element, each having a current-input terminal, a current-output terminal and a control terminal, wherein said current-input terminals of said switch elements are connected to one another and to said supply input in a manner that configures the current-input terminals to receive respective positive currents from the supply input; and said current-output terminals of said switch elements are configured to output positive currents and are each connected to a respective one of said input terminals of said primary winding; and
   a first inductive element and a second inductive element, said first inductive element being connected between said first input terminal and said control terminal of said first switch element, and said second inductive element being connected between said second input terminal and said control terminal of said second switch element, wherein said first and second inductive elements include windings arranged in prolongation respectively of said first input terminal and said second input terminal.

3. The converter according to claim 1 wherein said first and second windings each comprise two to ten turns.

4. The converter according to claim 1, further comprising a first charge-storage element and a second charge-storage element, said first charge-storage element being coupled between said first input terminal and said base of said first NPN transistor, said second charge-storage element being coupled between said second input terminal and said base of said second NPN transistor, said first and second charge-storage elements and said bases of said first and second NPN transistors forming, respectively, a first node and a second node.

5. The converter according to claim 4 wherein said charge-storage elements are capacitors.

6. The converter according to claim 4, further comprising a first resistive triggering element and a second resistive triggering element, said first resistive triggering element being connected between said first node and said supply input, and said second resistive triggering element being connected between said second node and said supply input.

7. The converter according to claim 4, further comprising a first resistive base element and a second resistive base element, said first resistive base element being connected between said base of said first NPN transistor and said first node, said second resistive base element being connected between said base of said second NPN transistor and said second node.

8. The converter according to claim 1, wherein said primary winding comprises a central tap connected to a reference potential region.

9. The converter according to claim 1, wherein said switch elements are housed in a single package.

10. The converter according to claim 1, wherein said secondary winding controls a cold-cathode fluorescent lamp.

11. The converter according to claim 1, of current-source type, wherein said supply input receives a voltage, and an inductive element is coupled between said supply input and said collectors of said NPN transistors.

12. A push-pull converter, comprising:
   a supply input;
   a transformer having a primary winding and a secondary winding, the primary winding having a first terminal and a second terminal;
   a capacitive element connected between the first and second terminals;
   a first switch element and a second switch element, each having a first conduction terminal, a second conduction terminal, and a control terminal, wherein the first conduction terminals of the switch elements are connected to one another and to the supply input; and the second conduction terminals of the switch elements are coupled respectively to the terminals of the primary winding; and
   a first charge-storage element and a second charge-storage element, the first charge-storage element being coupled between the first terminal and the control terminal of the first switch element, the second charge-storage element being coupled between the second terminal and the control terminal of the second switch element.

13. The converter according to claim 12 wherein the switch elements are NPN transistors in common-collector configuration, the first conduction terminals are collector terminals and the second conduction terminals are emitter terminals.

14. The converter according to claim 12, further comprising:
   a first inductive element coupled between the first terminal and the first charge-storage element; and
   a second inductive element coupled between the second terminal and the second charge-storage element, the second inductive element having an opposite polarity compared to the first inductive element.

15. The converter according to claim 14 wherein the first and second inductive elements include windings arranged in prolongation of the primary winding.

16. The converter according to claim 12, further comprising:
   a first resistive triggering element coupled between the supply input and a first node between the first charge-storage element and the control terminal of the first switch element; and
   a second resistive triggering element coupled between the supply input and a second node between the second charge-storage element and the control terminal of the second switch element.

17. The converter according to claim 12, wherein the primary winding comprises a central tap connected to a reference potential region.

18. The converter according to claim 12, wherein the supply input receives a voltage, and an inductive element is coupled between the supply input and the first conduction terminals of the switch elements.

19. A lighting system, comprising:
   a fluorescent lamp; and
   a push-pull converter that includes:
   a supply input;
   a transformer having a primary winding and a secondary winding, the primary winding having a first terminal and a second terminal;
   a capacitive element coupled between the first and second terminals;
   a first switch element and a second switch element, each having a first conduction terminal, a second conduction terminal, and a control terminal, wherein the first conduction terminals of the switch elements are connected to one another and to the supply input; and the second conduction terminals of the switch elements are coupled respectively to the terminals of the primary winding; and
   a first charge-storage element and a second charge-storage element, the first charge-storage element being coupled between the first terminal and the control terminal of the first switch element, the second charge-storage element being coupled between the second terminal and the control terminal of the second switch element.

20. The lighting system of claim 19 wherein the switch elements are NPN transistors in common-collector configuration, the first conduction terminals are collector terminals and the second conduction terminals are emitter terminals.

21. The lighting system of claim 19, wherein the converter further includes:
   a first inductive element connected between the first terminal and the first charge-storage element; and
   a second inductive element connected between the second terminal and the second charge-storage element, the second inductive element having an opposite polarity compared to the first inductive element.

22. The lighting system of claim 21 wherein the first and second inductive elements include windings arranged in prolongation of the primary winding.

23. The lighting system of claim 19 wherein the converter further includes:
   a first resistive triggering element coupled between the supply input and a first node between the first charge-storage element and the control terminal of the first switch element; and
   a second resistive triggering element coupled between the supply input and a second node between the second charge-storage element and the control terminal of the second switch element.

24. The lighting system of claim 19, wherein the primary winding comprises a central tap coupled to a reference potential region.

25. The lighting system of claim 19, wherein the supply input receives a voltage, and an inductive element is coupled between the supply input and the first conduction terminals of the switch elements.

26. The converter according to claim 1 wherein the capacitive element has a first terminal directly connected to the emitter of said first NPN transistor and a second terminal directly connected to the emitter terminal of said second NPN transistor.

27. The converter according to claim 1 wherein the collector of each NPN transistor is a current-input terminal configured to receive a positive current from the positive supply input, and the emitter of each NPN transistor is a current-output terminal configured to output a positive current.

* * * * *